United States Patent Office 3,268,645
Patented August 23, 1966

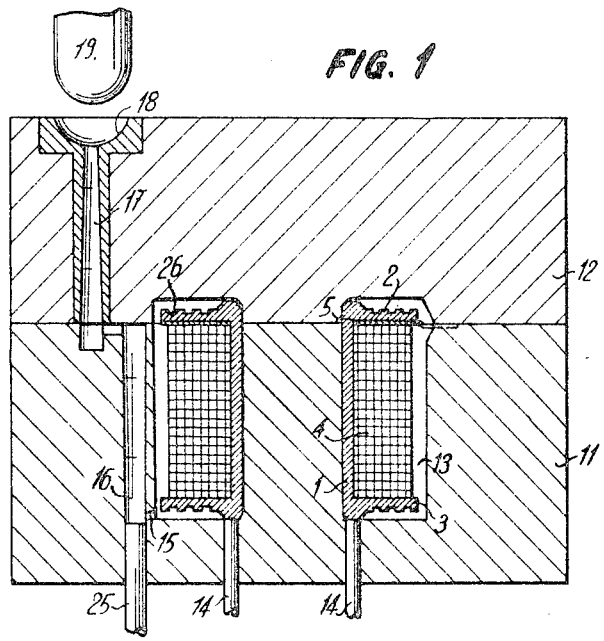
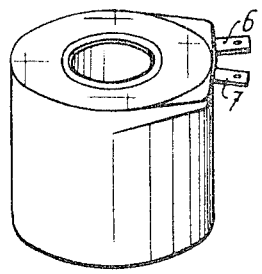
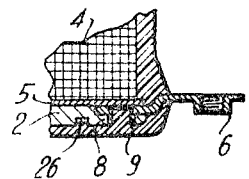
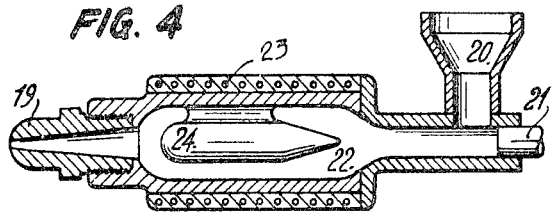

3,268,645
PROCESS FOR EMBEDDING A WINDING IN A MIXTURE OF THERMOPLASTIC SYNTHETIC MATERIAL
Harald Stampfli, Geneva, Switzerland, assignor to Lucifer S.A., Carouge-Geneva, Switzerland, a corporation of Switzerland
Filed Nov. 16, 1962, Ser. No. 238,183
Claims priority, application Switzerland, Nov. 20, 1961, 13,498/61
5 Claims. (Cl. 264—272)

The present invention concerns a process for embedding a winding in a mixture of thermoplastic synthetic material.

In the electrical industry, it is often desirable to arrange windings hermetically embedded in an insulating mass, with the object of avoiding all corrosion by outside agencies of the conductor wire constituting the winding. In certain usages, especially in automatic washing machines, it is evident that the windings of the relays must be effectively protected, since there is a risk of the windings receiving projections of hot water during the operation of the machine.

Electric windings embedded in an insulating mass have already been made but, up to the present time, this insulating mass was constituted by an epoxy resin which does not lend itself very well to mass production and to a low price. In fact resins of this class are expensive to buy but, above all, they necessitate a relatively long time to harden after their polymerisation, this time depending on the temperature at which polymerisation is effected, could be up to several hours. In the industrial production, of such windings, it is necessary to employ a considerable number of moulds and emplacements or stoves of large dimensions to receive these moulds. Besides, the handling of such windings is relatively time consuming as it is necessary to place the winding in the mould, fill this with polymerisable resin, place the mould in storage or more usually in a stove, take the mould out of the stove after a predetermined time, and then proceed to remove the winding which must frequently be stored for a certain time until the resin has acquired its final hardness.

It is known that thermoplastic materials are very advantageous for the manufacture of many articles as these can be injected into moulds to obtain large quantities of windings at high speeds, at low prices and the windings possess very good mechanical and insulating qualities. It has been found, in fact, that thermoplastic synthetic resins especially of the polyamide class, which resist high functioning temperatures, for example greater than a 150° C., possess excellent insulating characteristics. However, after the injection, the melting temperature of these synthetic resins is still higher and it is often greater than the maximum temperature that the insulator of a conductor wire can withstand. This results in great difficulties in the manufacture of electric windings embedded in a thermoplastic resin mass, which difficulties up to the present time have prevented the manufacture of such windings.

An object of the present invention is to permit the manufacture in large quantities and at an advantageous price, of electric windings embedded in an insulating mass.

According to the present invention, a process for embedding a winding in a mass of thermoplastic synthetic material, is characterised in that a mould is used which is adapted to contain the winding, this mould presenting at least one introduction orifice for thermoplastic material, and being dimensioned in such a manner that the section of the passages between the winding and the walls of the mould undergo at least an enlargement in the direction of advancement of material in the mould when it is being filled and is further characterised in that the material is injected hot and under pressure, into the mould.

The invention will now be described further, by way of example, with reference to the accompanying drawing, in which:

FIG. 1 is a section through a mould used for the injection of thermoplastic material around an electric winding;

FIG. 2 is a perspective view of the winding obtained from the mould shown in FIG. 1;

FIG. 3 is a sectional detail of this winding; and

FIG. 4 is a schematic view of a known type of machine for the injection of thermoplastic materials.

FIG. 1 shows an electric winding placed in a mould, before the injection of thermoplastic material which is to surround the winding completely and in a hermetic fashion. This winding is constituted, in a conventional manner, by a coil body comprising a central tubular part and two cheeks 2 and 3, an insulated conductor wire being wound on the coil body 1 between the two cheeks to form a winding 4.

A washer 5 of insulating material (FIG. 3) is disposed between the winding 4 and the upper cheek 2. Two terminals 6 and 7 (FIG. 2) can be introduced after winding, as can be seen in FIG. 3, between the said washer 5 and the adjoining flexible cheek 2. This cheek 2 presents at least one bore 8 serving to house a tubular part 9 which projects from the body of the terminal 6. Thus, after the injection of the thermoplastic synthetic resin 10 which covers the whole winding, a small amount of this resin penetrates into the tubular part 9 and maintains the respective terminal firmly in position. The mould shown in FIG. 1 comprises two parts, namely a main part 11 and a cover 12. The part 11 has a cavity 13 adapted to receive the body of the coil with its winding, and two extractors 14 passing through the base of this cavity to facilitate the removal from the mould after injection. The base of this cavity communicates, by means of a passage 15 of small section, with a conduit 16 to bring the thermoplastic resin into the mould. This conduit 16 is extended by a conduit 17 pierced through the cover 12, this conduit 17 being of conical form and terminating in a spherical portion 18 adapted to receive the injection nozzle of the injection machine. Such a machine, which is known per se, is represented by way of example in FIG. 4. It comprises mainly a hopper 20 for the introduction of thermoplastic granular material, a piston 21 adatped to push the material coming from the hopper 20 into a fusion chamber 22 for the thermoplastic material. To this end, this chamber 22 is surrounded by an electric heating element 23. A body 24 is placed in the chamber 22 to increase the surface of contact between the walls of this chamber and the synthetic resin. Under the pressure exerted by the piston 21, the material leaves the chamber 22, in the molten state, and passes through the injection nozzle 19 which is screwed to the machine.

The free section of the orifice 15 is at least ten times smaller than that of the entry orifice of the conduit 17, preferably between fifteen and twenty times smaller.

Such an injection machine can be charged with a thermoplastic synthetic resin, for example of the polyamide type, adapted to withstand, after hardening, a temperature of at least 130° C. which gives excellent properties to the winding obtained. Of course, the quality of the resin used can be chosen as a function of the temperature requirements of the winding which is to be made and there could be used, in accordance with the particular case, thermoplastic resins presenting a permissible maximum temperature lower than 130° C. or, on the contrary, higher if circumstances so require.

With reference to FIG. 1, the molten material injected through the nozzle 19 first passes through the parts 17 and 16 of the material introduction conduit, then through the small section orifice 15 to penetrate into the cavity 13 of the mould 11, 12. This mould is dimensioned in such a manner that the section of the passages between the winding and the walls of the mould undergo at least an enlargement in the direction of advancement of the material in a mould when it is being filled. The material which penetrates into the mould through the orifice 15 is, as is known, very viscous as this is in the molten state. By reason of the length of the conduits 17 and 16, this material has already undergone a certain cooling from the nozzle 19, which of course augments its viscosity. Besides, in spite of the very short duration of time of the filling of the mould, the material still cools down in penetrating into the mould as a result of the decompression which it undergoes after passing through the orifice 15 so that at the moment where it contacts the winding 4, its temperature is lowered below the maximum temperature which the insulation of the wire forming the winding 4 can withstand.

It is clearly shown in FIG. 1 that the distance between the edges of the cheeks 2 and 3 and the walls of the mould is not constant in the mould and it is to be noted especially that this distance is smaller, so far as the cheek 3 is concerned, on the side of the orifice 15 than on the one which is opposed thereto. Likewise, the distances between the cheek 2 and the wall of the mould are greater than the corresponding distances between the cheek 3 and the walls of the mould. By an exact choice of these dimensions, there can be obtained an approximate balancing of the pressures exerted by this synthetic material on the winding in the course of the injection. The main idea which permits obtaining or to approach this balance resides in the fact that the free section for the passage of the injected material must enlarge at the same time as the increase in the viscosity of this material effected by the cooling of the material in the course of injection.

After injection, the parts 11 and 12 of the mould are separated from the mould in known manner, and the moulded piece is extracted from the cavity of the mould by means of extractors 14, while the material remains imprisoned in the conduit 16 is extracted therefrom by means of an extractor 25. The winding embedded in thermoplastic material forms a body which is aesthetically pleasing as is shown in FIG. 2.

As can be seen in FIG. 1, the outer sides of the cheeks 2 and 3 each have three annular grooves 26 into which penetrates the thermoplastic material which covers the cheeks. This disposition assures a perfect watertightness between the cheeks 2 and 3 of the coil body and the envelope of thermoplastic material. It is known, in fact that this material undergoes a slight shrinking after cooling, so that after the injection, the thermoplastic envelope exercises a tension tending to press the cheeks 2 and 3 towards each other, this pressure ensuring, in combination with the labrynth formed by the grooves 26, an excellent watertightness.

Of course, modifications can be foreseen in the process described, in particular when the temperature of the injected material is, at the exit from the orifice 15, greater than the maximum temperature which the insulator of the conductor wire can withstand, the winding could be covered fully, or in part, with a protective foil to prevent direct contact between the injected material and insulator of the wire forming the winding. This protective foil could especially be in polytetrafluorethylene. Of course there could be conceived a larger or smaller number of grooves 26 and, in certain embodiments, these grooves could be entirely omitted. In the case of windings constituted by a relatively rigid conductor, it is not necessary to provide a coil body and the winding could be entirely embedded in thermoplastic material.

I claim:
1. In a process for embedding a winding in a mass of thermoplastic synthetic material, the steps of placing the winding in a cavity defined by the walls of a mould such as to leave a passage between said winding and said walls, injecting said thermoplastic synthetic material into said passage in a hot state and under pressure, wherein said passage undergoes an enlargement in the direction of advancement of said injected material.

2. A mould for use in the embedding of a winding in a mass of thermoplastic synthetic material, a cavity defined by walls of a mould and adapted to receive said winding in such a manner that a passage is present between said winding and said walls, conduit means for the forwarding of said thermoplastic synthetic material passing through said mould and leading into said cavity, and means for introducing hot thermoplastic synthetic material under pressure into said conduit means, said cavity being so dimensioned that said passage undergoes an enlargement in the direction of advancement of said introduced material.

3. A mould for use in the embedding of a winding in a mass of thermoplastic synthetic material, a cavity defined by walls of a mould and adapted to receive said winding in such a manner that a passage is present between said winding and said walls, conduit means for the forwarding of said thermoplastic synthetic material passing through said mould, a discharge orifice leading from said conduit into said cavity, and a connection mouthpiece for introducing hot thermoplastic synthetic material under pressure into said conduit means, said cavity being so dimensioned that said passage undergoes an enlargement in the direction of advancement of said introduced material, the dimension of said discharge orifice being at least ten times smaller than the dimension of an entry orifice of said conduit.

4. A mould according to claim 3, wherein the conduit is of such a length as to permit a cooling of the hot thermoplastic synthetic material from said entry orifice of said conduit to said discharge orifice.

5. A mould for use in the embedding of a winding in a mass of thermoplastic synthetic material, said winding comprising a conductor wire wound on a coil body having two cheeks, a cavity defined by walls of a mould and adapted to receive said winding in such a manner that a passage is present between said winding and said walls, conduit means for the forwarding of said thermoplastic synthetic material passing through said mould, a discharge orifice leading from said conduit into said cavity, said discharge orifice having a longitudinal axis which is parallel to the plane of one of the cheeks and displaced with respect thereto such that the thermoplastic synthetic resin is directed between the wall of the mould and the outer face of this cheek, the distance between the periphery of one cheek and the wall of the mould being smaller for the cheek in the plane in which the injection is effected than for the other cheek, and a connection mouthpiece for introducing hot thermoplastic synthetic material under pressure into said conduit means, said cavity being so dimensioned that said passage undergoes an enlargement in the direction of advancement of said introduced material.

References Cited by the Examiner

UNITED STATES PATENTS

| | | | |
|---|---|---|---|
| 1,810,499 | 6/1931 | Romp | 336—222 |
| 2,060,856 | 11/1936 | Bell | 336—222 |
| 2,956,312 | 10/1960 | Naimer | 264—272 |
| 2,975,487 | 3/1961 | Williams | 264—272 |
| 3,057,014 | 10/1962 | Kirch | 264—272 |

ROBERT F. WHITE, *Primary Examiner.*

ALEXANDER H. BRODMERKEL, *Examiner.*

F. MARLOWE, T. J. CARVIS, *Assistant Examiners.*